United States Patent
Hudman

(10) Patent No.: US 9,958,758 B2
(45) Date of Patent: May 1, 2018

(54) MULTIPLE EXPOSURE STRUCTURED LIGHT PATTERN

(71) Applicant: Microsoft Technology Licensing, LLC, Redmond, WA (US)

(72) Inventor: Joshua M. Hudman, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 280 days.

(21) Appl. No.: 14/602,074

(22) Filed: Jan. 21, 2015

(65) Prior Publication Data

US 2016/0209729 A1 Jul. 21, 2016

(51) Int. Cl.
| | |
|---|---|
| G02B 27/48 | (2006.01) |
| G03B 15/06 | (2006.01) |
| G06T 7/00 | (2017.01) |
| H04N 5/335 | (2011.01) |
| G01S 17/46 | (2006.01) |
| G01S 17/89 | (2006.01) |
| G01S 7/481 | (2006.01) |

(52) U.S. Cl.
CPC ............ *G03B 15/06* (2013.01); *G01S 7/4814* (2013.01); *G01S 17/46* (2013.01); *G01S 17/89* (2013.01); *G02B 27/48* (2013.01); *H04N 5/335* (2013.01)

(58) Field of Classification Search
CPC ............ G01B 11/2513; G01B 11/2545; G01N 21/4738; G01N 21/8806; G06T 7/521; H04N 13/0253; H04N 5/335; G02B 27/48
USPC .......................................... 362/259; 359/618
See application file for complete search history.

(56) References Cited

U.S. PATENT DOCUMENTS

| | | | |
|---|---|---|---|
| 5,870,136 A | 2/1999 | Fuchs et al. | |
| 6,101,269 A | 8/2000 | Hunter et al. | |
| 7,672,550 B2 * | 3/2010 | Murase .............. | G02B 27/0966 359/19 |

(Continued)

FOREIGN PATENT DOCUMENTS

| | | |
|---|---|---|
| WO | 2012160470 A1 | 11/2012 |
| WO | 2014044569 A1 | 3/2014 |

OTHER PUBLICATIONS

"International Search Report and Written Opinion Issued in PCT Application No. PCT/US2016/012011", dated May 10, 2016, 12 Pages.

Guan, et al., "Composite Structured Light Pattern for Three-Dimensional Video", In Proceedings of Optics Express, vol. 11, No. 05, Mar. 10, 2003, pp. 406-417.

(Continued)

*Primary Examiner* — Nathnael Aynalem

(74) *Attorney, Agent, or Firm* — Fiala & Weaver P.L.L.C.

(57) ABSTRACT

Methods, systems, apparatuses, and computer program products are provided for illuminating a scene with light containing speckle patterns. A plurality of instances of coherent light are generated in sequence. From each instance of coherent light of the plurality of instances of coherent light, a corresponding instance of illumination light is generated that contains a respective speckle pattern, thereby generating a plurality of instances of illumination light containing a plurality of respective speckle patterns. The plurality of speckle patterns are configured such that a summation of the plurality of speckle patterns forms a substantially uniform illumination pattern. The plurality of instances of illumination light are projected into an illumination environment in sequence.

20 Claims, 6 Drawing Sheets

(56) References Cited

U.S. PATENT DOCUMENTS

| | | | |
|---|---|---|---|
| 8,265,375 B2* | 9/2012 | Shirley | G06T 7/0057 356/600 |
| 8,390,821 B2* | 3/2013 | Shpunt | G01B 11/25 356/512 |
| 8,611,642 B2 | 12/2013 | Wang | |
| 2007/0052953 A1 | 3/2007 | Hill | |
| 2007/0216894 A1* | 9/2007 | Garcia | G01B 11/2545 356/4.01 |
| 2008/0106746 A1 | 5/2008 | Shpunt et al. | |
| 2010/0277705 A1* | 11/2010 | Gollier | H04N 9/3129 353/121 |
| 2010/0309288 A1 | 12/2010 | Stettner et al. | |
| 2011/0317130 A1* | 12/2011 | Gollier | H04N 9/3129 353/20 |
| 2012/0056982 A1 | 3/2012 | Katz et al. | |
| 2014/0049609 A1 | 2/2014 | Wilson et al. | |
| 2014/0049610 A1 | 2/2014 | Hudman et al. | |
| 2014/0049766 A1 | 2/2014 | Hudman | |

OTHER PUBLICATIONS

Schmeing, et al., "Real-Time Depth Fusion Using a Low-Cost Depth Sensor Array", In Proceedings of 3DTV-Conference: The True Vision—Capture, Transmission and Display of 3D Video, Jul. 2, 2014, 4 pages.

Kim, et al., "Multi-View Image and Tof Sensor Fusion for Dense 3d Reconstruction", In IEEE 12th International Conference on Computer Vision Workshops (ICCV Workshops), Sep. 27, 2009, pp. 1542-1549.

Park, et al., "High quality depth map upsampling for 3D-TOF cameras", In IEEE International Conference on Computer Vision, Nov. 6, 2011, pp. 1623-1630.

Merrell, et al., "Real-Time Visibility-Based Fusion of Depth Maps", In IEEE 11th International Conference on Computer Vision, Oct. 14, 2007, 8 pages.

"Second Written Opinion Issued in PCT Application No. PCT/US2016/012011", dated Jan. 3, 2017, 6 Pages.

* cited by examiner generate a first instance of coherent light received by a first patterned element and a second instance of coherent light received by a second patterned element by a single light source 902 — generate a first instance of coherent light by a first light source that is received by a first patterned element and a second instance of coherent light by a second light source that is received by a second patterned element

1102

Generate a first instance of coherent light at a first wavelength and a second instance of coherent light at a second wavelength by a same light source

MULTIPLE EXPOSURE STRUCTURED LIGHT PATTERN

BACKGROUND

In a time-of-flight (TOF) depth camera, light is projected from a light source into an image environment to illuminate one or more objects in the image environment. A diffuser may be used to spread the light throughout the image environment. Light reflected from the image environment is focused onto an image sensor. A timing of the received light is determined, and the timing is used to determine distances to various points in the environment.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are provided for illuminating a scene with multiple instances of light containing speckle patterns. A plurality of instances of coherent light are generated in sequence. From each instance of coherent light of the plurality of instances of coherent light, a corresponding instance of illumination light is generated that contains a respective speckle pattern, thereby generating a plurality of instances of illumination light containing a plurality of respective speckle patterns. The plurality of speckle patterns are configured such that a summation of the plurality of speckle patterns forms a substantially uniform illumination pattern. The plurality of instances of illumination light are projected into an illumination environment in sequence.

Further features and advantages of various embodiments of the disclosure, as well as the structure and operation of various embodiments of the disclosure, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 1 schematically shows a time-of-flight (TOF) depth camera in an example use environment, according to an exemplary embodiment.

Figure 4:
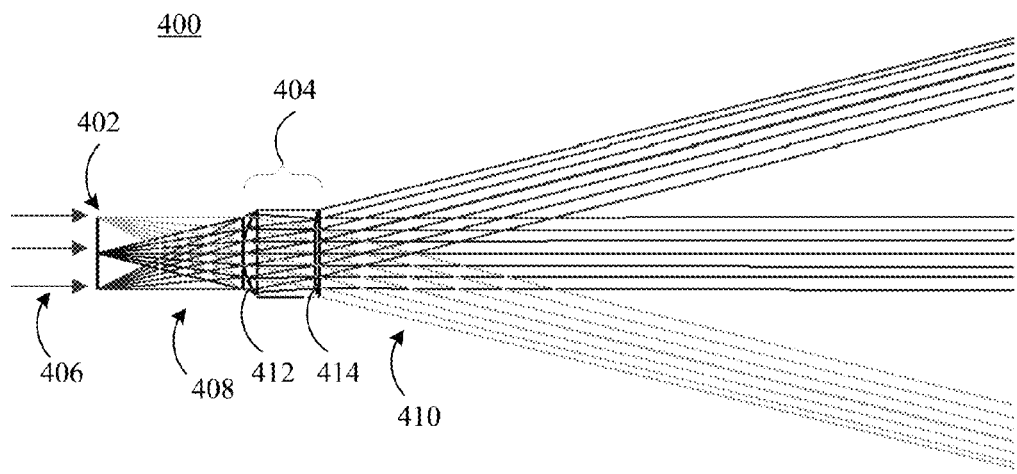

FIG. 4 schematically shows an example of an optical assembly configured to project a series of speckle patterns into an image environment, according to an embodiment.

Figure 5:
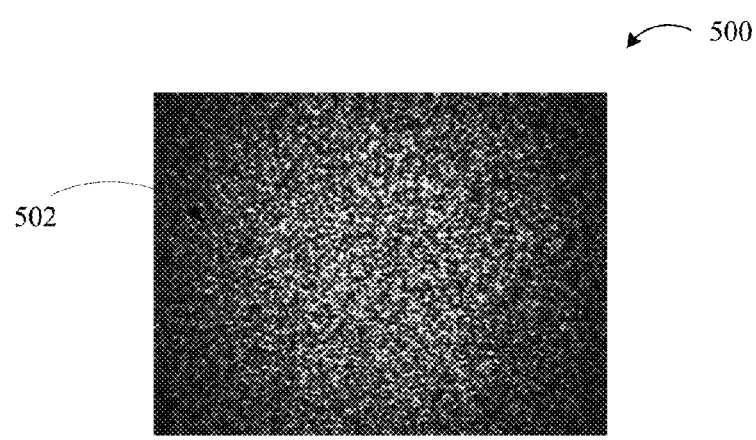

FIG. 5 shows a view of an example speckle pattern.

Figures 6, 7:
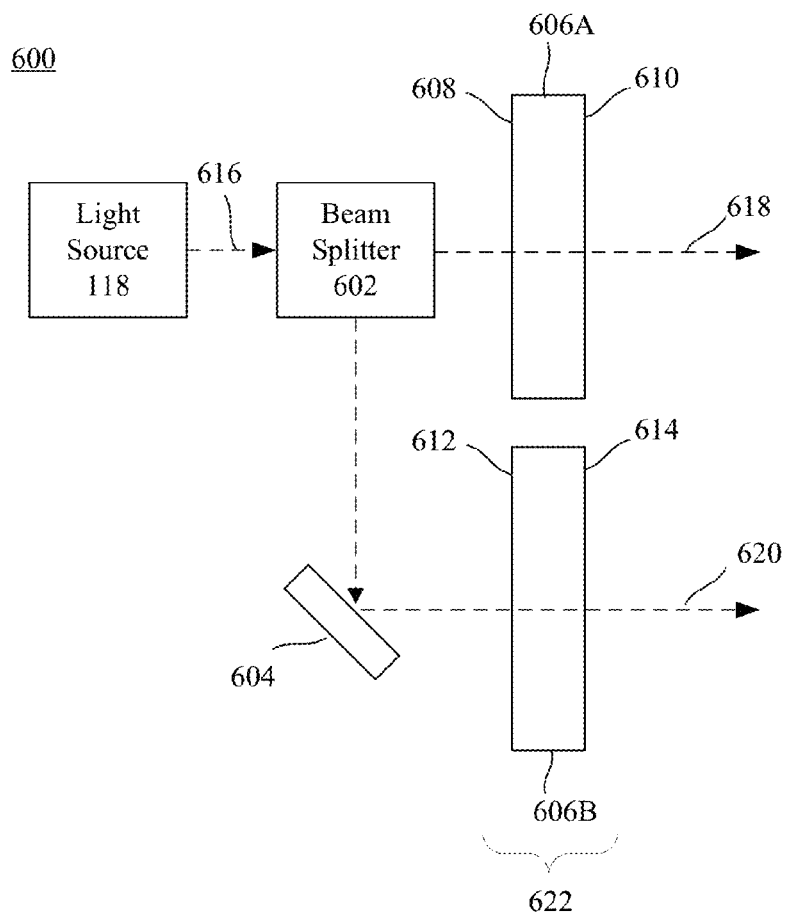

FIG. 6 shows a block diagram of an illuminator that contains a light source that transmits first and second light beams respectively through first and second patterned elements to generate first and second speckle patterns, according to an example embodiment.

FIG. 7 shows a process for using a same light source to generate first and second light beams that transmit respectively through first and second patterned elements to generate first and second speckle patterns, according to an example embodiment.

Figures 8, 9:
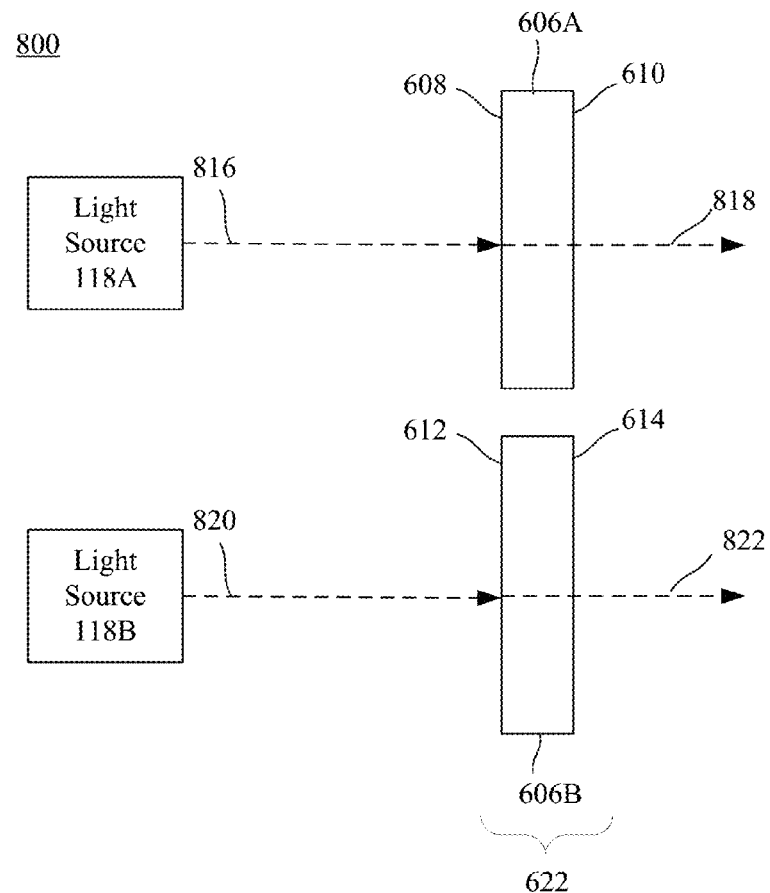

FIG. 8 shows a block diagram of an illuminator that contains first and second light sources that respectively transmit first and second light beams through first and second patterned elements to generate first and second speckle patterns, according to an example embodiment.

FIG. 9 shows a process for using first and second light sources to generate first and second light beams, respectively, that transmit through first and second patterned elements to generate first and second speckle patterns, according to an example embodiment.

Figures 10, 11:
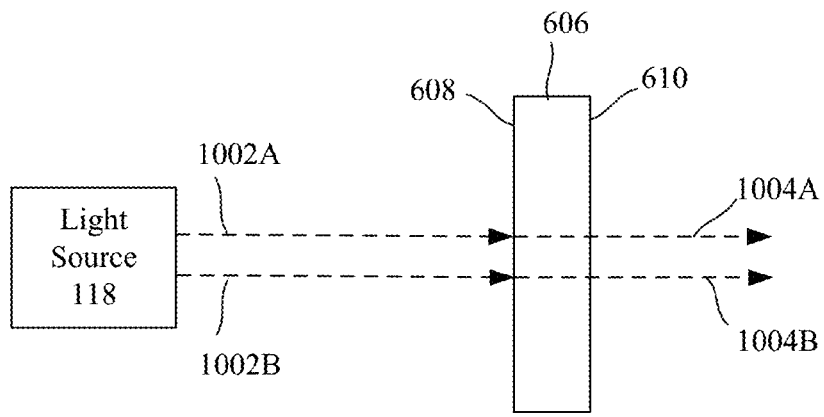

FIG. 10 shows a block diagram of an illuminator that contains a light source that transmits first light at a first wavelength through a patterned element, and transmits second light at a second wavelength through the patterned element, to generate first and second speckle patterns, according to an example embodiment.

FIG. 11 shows a process for using a same light source to transmit first light at a first wavelength through a patterned element, and transmit second light at a second wavelength through the patterned element, to generate first and second speckle patterns, according to an example embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner

II. Example Embodiments for Illuminating an Image Environment with Multiple Illumination Patterns in Sequence As mentioned above, a depth camera (e.g., a time of flight (TOF) depth camera) may utilize light pulses (e.g., infrared and/or visible light) projected from the depth camera into an image environment. The illumination light pulses reflect from the various surfaces of objects in the image environment and are received by an image sensor. A TOF depth camera generates distance data by quantifying time-dependent return light information. In other words, because light is detected sooner when reflected from a feature nearer to the photosensitive surface than from an object feature farther away, the TOF depth camera can determine distance information about the object's features.

Depth cameras that use textured light or structured light to generate depth maps of a scene typically use diffractive elements to create such patterns. However, infrared (IR) images used for IR face detection, or other standard imaging technologies, cannot be used with such diffractive elements because of noise caused in generated images by the structured light.

According to embodiments, multiple (e.g., two or more) structured light images or patterns are generated that are opposites or complements of each other. A structured light pattern is a predetermined pattern of light that may be projected onto a scene. Two structured light patterns are compliments of each other if, spatially, the pattern of light of one of the structured light patterns substantially fills in areas of a scene not illuminated by the pattern of light of the other structured light pattern. More than two structured light patterns may be complimentary if together their patterns of light substantially fill in all of the areas of a scene (without substantial light overlap).

In particular, in an embodiment, the multiple structured light images that are generated include speckle patterns. A speckle pattern is a light intensity pattern produced by the mutual interference of a set of wavefronts. The speckle patterns are configured to be complementary such that, spatially, the speckle pattern of one light image substantially fills in the areas not illuminated by the speckle pattern of one or more other light images (without substantial light overlap). Because the generated speckle patterns are complementary, images captured from the imaging environment based on reflections of the complementary speckle patterns can be averaged to reduce or eliminate noise that is otherwise caused by the variation of light intensity across an illuminated area by a structured light pattern. This enables clean images of an image environment to be generated with little to no structure noise. Furthermore, the multiple image captures enable a higher resolution depth map to be generated. This is because each additional captured image (of the image environment illuminated by a corresponding speckle pattern) increases the overall image resolution (of the collective, summed captured images). In an embodiment, each captured image may be individually analyzed to determine a depth map indicating environmental depth (e.g., of objects), and the individual depth maps may be combined to create an overall depth map that has higher resolution than a depth map generated from a single captured image.

By using two speckle patterns that are opposites of (complement) each other, or three or more speckle patterns that collectively complement each other, the noise generated by a signal depth pattern can be filled in. As such, multiple exposures are used in a similar manner to what is done with HDR (high dynamic range) images.

According to an embodiment, multiple speckle patterns are generated and projected to an image environment using one or more patterned elements, such as a diffraction element, a mask, etc. The speckles patterns are configured to be substantially complementary, such that a sum of the speckle patterns creates a fully illuminated scene. A first image/exposure of the image environment may be captured while the first illumination optics with first speckle pattern is projected. Subsequently, one or more additional images/exposures are captured while one or more respective illumination optics, each with a corresponding speckle pattern, is/are each individually projected. The captured images/exposures may be added together to create a single image that is substantially noise free.

Figure 1:
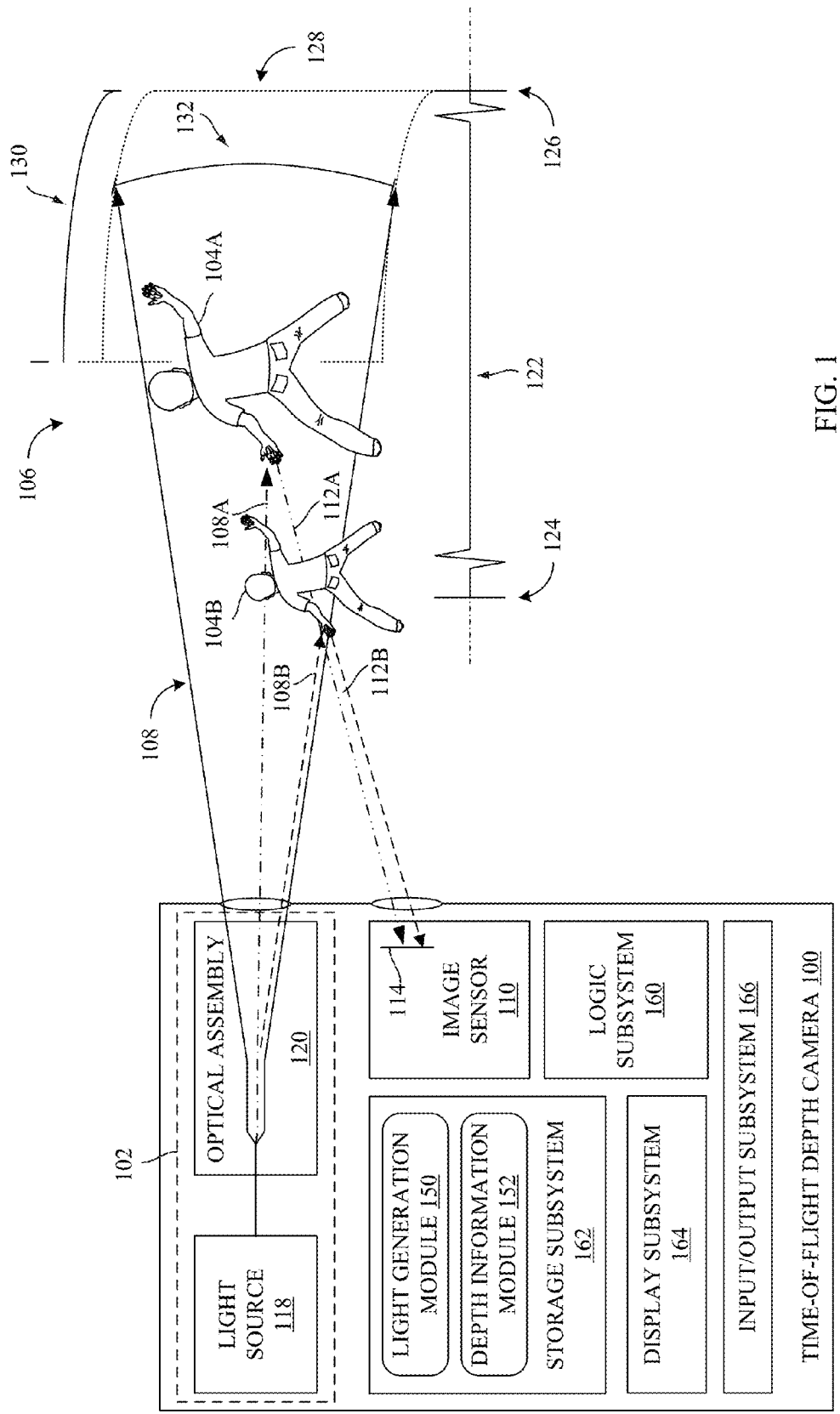

FIG. 1 schematically shows an embodiment of a TOF depth camera 100. In the embodiment shown in FIG. 1, TOF depth camera 100 includes an illuminator 102 configured to illuminate an image environment 106 with illumination light 108 (including illuminating first and second objects 104A and 104B), and may include an image sensor 110 configured to detect return light 112. For example, first object 104A may be positioned in a first region of image environment 106 (e.g., at a far field location, or relatively far from camera 100) and second object 104 may be positioned in a second region of image environment 106 (e.g., at a near field location, or relatively near to camera 100). A first ray of illumination light 108A striking a portion of object 104A is reflected as return light 112A, and a second ray of illumination light 108B striking a portion of object 104B is reflected as return light 112B. Photons from return light 112 may be collected and used to generate depth information for objects 104A and 104B, as explained elsewhere herein.

While the example shown in FIG. 1 depicts a single illuminator 102 included within TOF depth camera 100, it will be appreciated that a plurality of illuminators 102 may be included within TOF depth camera 100 to illuminate an image environment.

TOF depth camera 100 also includes an image sensor 110 configured to detect at least a portion of return illumination light 112 reflected from image environment 106. Image sensor 110 includes a detector 114 for collecting return illumination light 112 for use in generating depth information (such as a depth map) for the scene.

In the embodiment shown in FIG. 1, illuminator 102 includes a light source 118 configured to generate coherent light and an optical assembly 120 configured to shape the coherent light and direct it toward image environment 106. Light source 118 may emit coherent light at any suitable wavelength(s), including but not limited to infrared and visible wavelengths.

In some embodiments, light source 118 may include one or more individual light producing elements arranged in a light cluster. As used herein, a light cluster refers to an arrangement or grouping of a plurality of light emitters configured to emit coherent light. In some embodiments, the plurality of light emitters may be included in a common housing. Such light clusters may have any suitable shape, and may include any suitable number of light emitters. In an embodiment, light source 118 may include a linearly-shaped light bar having a plurality of light emitters arranged in parallel. For example, in one specific example, a light bar may be configured to emit parallel beams of light from eleven parallel light emitters.

For the purposes of discussion, light image environment 106 may be broken down into an illumination depth region and an illumination envelope region. The illumination depth region refers to a depth of focus of the projected light. In the embodiment shown in FIG. 1, illumination light 108 is projected to an illumination depth region 122 bounded by a near edge 124 and a far edge 126. Illumination depth region 122 may have any suitable range. In one non-limiting example, illumination depth region 122 may be approximately 3.5 m deep.

The illumination envelope region refers to a cross-sectional area that is lit with illumination light 108. In the embodiment shown in FIG. 1, a rectangular-shaped illumination envelope region 128 is represented with horizontal dimension 130 and with vertical dimension 132. However, it will be appreciated that any suitably shaped illumination envelope region 128 (e.g., an elliptical shape, a polygon shape, or other closed shape) may be formed without departing from the scope of the present disclosure.

Figure 2:
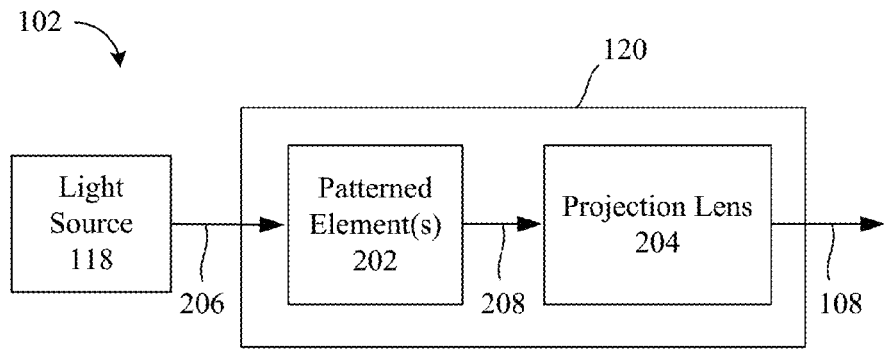
FIG. 2 shows a block diagram of an illuminator configured to generate speckle patterns, according to an example embodiment.

FIG. 2 shows a block diagram of an example of illuminator 102, and illustrates an example embodiment of optical assembly 120. In the embodiment shown in FIG. 2, optical assembly 120 includes one or more patterned elements 202 configured to pattern coherent light 206 into patterned light 208, and a projection lens 202 configured to project patterned light 308 into an image environment as illumination light 108, as explained in more detail below.

Figure 3:
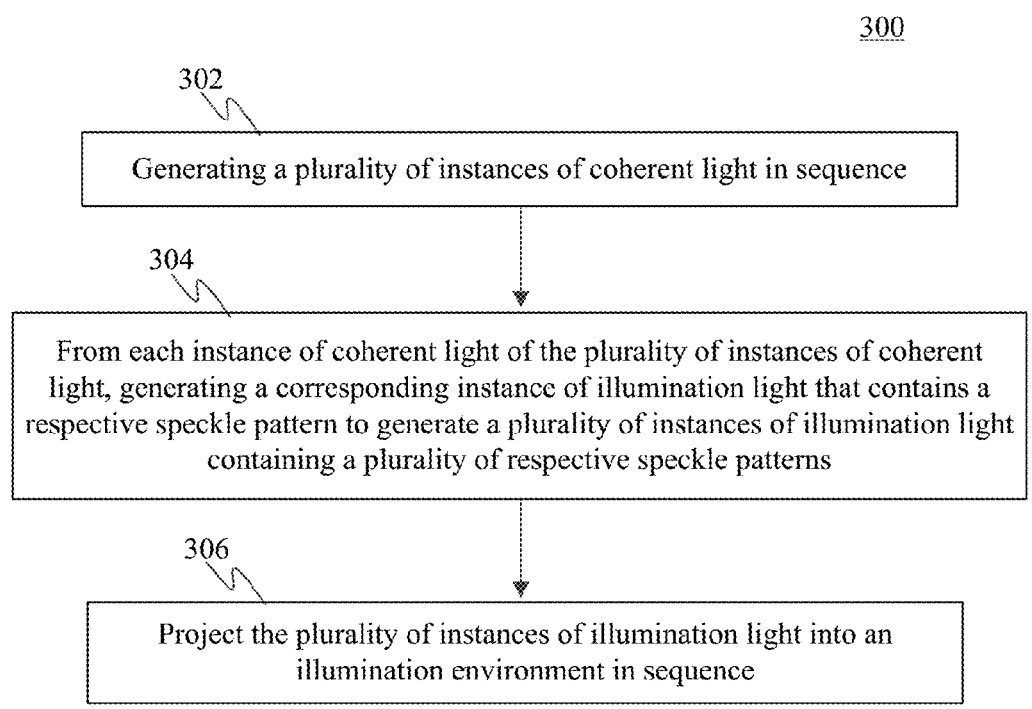
FIG. 3 shows a flowchart providing a process for projecting illumination light that includes speckle patterns into an image environment, according to an example embodiment.

For example, FIG. 3 shows a flowchart 300 providing a process for projecting illumination light that includes speckle patterns into an image environment, according to an example embodiment. Illuminators 102 of FIGS. 1 and 2 may each operate according to flowchart 300, in embodiments. Further structural and operational embodiments will be apparent to persons skilled in the relevant art(s) based on the following description of FIG. 2 and flowchart 300.

Flowchart 300 begins with step 302. In step 302, a plurality of instances of coherent light is generated. For example, as shown in FIG. 2, light source 118 may generate coherent light 206. Coherent light 206 is coherent light having any suitable wavelength(s), including but not limited to infrared and visible wavelengths. Furthermore, light source 118 sequentially generates multiple instances of coherent light 206. Each instance of coherent light 206 may separately illuminate an image environment, and a corresponding image of the image environment may be captured for each instance of coherent light 206.

In one embodiment, a single light source of light source 118 may generate the multiple instances of coherent light 206. Alternatively, multiple lights sources of light sources 118 may each generate one or more corresponding instances of coherent light 206. The multiple instances of coherent light 206 may have the same properties or may have different properties. For instance, different instances of coherent light 206 may have different frequencies/wavelengths from each other, different amplitudes from each other, etc.

In step 304, from each instance of coherent light of the plurality of instances of coherent light, a corresponding instance of illumination light is generated that contains a respective speckle pattern, to generate a plurality of instances of illumination light containing a plurality of respective speckle patterns. For example, as shown in FIG. 2, optical assembly 120 receives coherent light 206, and generates illumination light 108, which is projected into image environment 106. Illumination light 108 illuminates objects in image environment 106, such as objects 104A and 104B, and reflected light from the illuminated objects may be used to sense a depth of the objects, as well as being used to determine other features of the objects (e.g., shape, size, etc.).

In particular, patterned element(s) 202 of optical assembly 120 processes the received instances of coherent light 206 to generate corresponding instances of patterned light 208 that include speckle patterns. For example, as described above, patterned element(s) 202 includes one or more transparent optical elements configured that each generate one or more of the instances of patterned light 208 with speckle patterns. Each instance of patterned light 208 includes a corresponding speckle pattern. As such, multiple instances of coherent light 206 are received, and patterned element(s) generate multiple corresponding instances of patterned light 208, which are received by projection lens 204 to generate a corresponding plurality of instances of illumination light 108.

In step 306, the plurality of instances of illumination light is projected into an illumination environment in sequence. In an embodiment, as shown in FIG. 2, projection lens (or "relay lens") 204 may be configured to project the instances of patterned light 208 into an image environment (e.g., image environment 106 of FIG. 1) as illumination light 108. In embodiments, projection lens 204 may include one or more lenses and/or other optical elements that are configured to project the instances of illumination light 108 into the image environment. Projection lens 204 may be configured to spread (e.g., in the horizontal and/or vertical directions) and/or otherwise process each of the instances of patterned light 208 when generating the corresponding instances of illumination light 108.

FIG. 4 schematically shows an example of an optical assembly 400 configured to project speckle patterns into an image environment, according to an embodiment. Optical assembly 400 is an example of optical assembly 120 of FIG. 2, and may operate according to steps 304 and 306 of flowchart 300 of FIG. 3, in an embodiment. As shown in FIG. 4, optical assembly 400 includes a patterned element 402 and a projection lens 404. Optical assembly 400 is described as follows.

As shown in FIG. 4, patterned element 402 receives coherent light 406 (e.g., from one or more light sources). Coherent light 406 includes coherent light of any suitable wavelength(s), including but not limited to infrared and visible wavelengths. Patterned element 402 is an example of patterned element(s) 202 of FIG. 2. Patterned element 402 may be made of any suitable transparent material, including an optical grade material, such as a plastic or polymer (e.g., optical grade poly(methyl methacrylate) (PMMA), optical grade polycarbonate (PC), other polymer(s)), a glass (e.g., an optical grade glass material), or other suitable material(s). Coherent light 406 passes through patterned element 402, to exit from patterned element 402 as patterned light 408, which contains a speckle pattern.

Patterned element 402 has a body that includes one or more patterned (rough) surfaces that cause interference of light waves passing therethrough. A patterned surface may be formed in any manner (e.g., milling, drilling, laser ablation, electrical discharge machining (EDM), etc.) to have a desired roughness based on any number of peaks and depressions (e.g., thousands of features, millions of features, etc.) at any pitch and scale, including the nanoscale (e.g., features having pitches and/or widths in the 50-100 nanometer range). The features may be dot-shaped (e.g., points or circles) or have other shapes, and may have uniform and/or non-uniform depths. The surface(s) of patterned element 402 may be patterned with any desired repeating or non-repeating pattern of surface features used to generate and tailor a desired interference pattern for light passing through in order to generate an output speckle pattern. The different heights/depths of the surface features cause changes in a phase and/or intensity of light waves of coherent light 406 passing through patterned element 402, and the light waves that exit patterned element 402 in patterned light 408 interfere with each other to create an interference pattern that defines the output speckle pattern in patterned light 408.

Projection lens 404 receives patterned light 408. Projection lens 404 is an example of projection lens 204 of FIG. 2. Projection lens 404 is configured to project patterned light 402 (with speckle pattern) into an image environment (e.g., image environment 106 of FIG. 1) as illumination light 410.

In the example of FIG. 4, projection lens 404 includes first and second lenses 412 and 414 configured to project the instances of illumination light 108 into the image environment. For example, in an embodiment, first lens 412 is positioned to receive patterned light 408 and spread and relay patterned light 408 as illumination light 108 into the image environment. Stated differently, first lens 412 provides the power within optical assembly 400 to transmit patterned light 408 into the image environment as illumination light 108. In an embodiment, first lens 412 inverts patterned light 408 in illumination light 108. First lens 412 may be a convex lens, an achromatic lens, an achromatic doublet, and/or other suitable lens or lens combination for relaying light as desired.

Second lens 414 is optionally present. In one example, when present, second lens 414 may be a Schmidt plate, positioned at an entrance pupil of optical assembly 400 or elsewhere. The Schmidt plate may be used to introduce aberrations in illumination light 410 to reduce an intensity of diffraction artifacts that may be introduced by surface-emitting lasers of the light source(s). Further, the Schmidt plate may help to achieve a desired light illumination profile. Because a defocusing effect of a Schmidt plate may reduce a depth of an illumination depth region (e.g., illumination depth region 122 of FIG. 1), inclusion of the Schmidt plate of second lens 414 may be accompanied by a compensatory adjustment to the f-number of optical assembly 400.

Projection lens 204 may be configured to spread (e.g., in the horizontal and/or vertical directions) and/or otherwise process each of the instances of patterned light 208 when generating the corresponding instances of illumination light 108.

FIG. 5 shows an image 500 of an example speckle pattern 502. As shown in FIG. 5, speckle pattern 502 includes a scattering of bright spots, or "speckles", over a lessor- or non-illuminated background. An intensity of the speckles of speckle pattern 502 is greatest in the center (on the optical axis), and decreases away from the center. The speckle effect is a result of the interference of many waves of the same frequency (of coherent light emitted by light source(s) 118), having different phases and amplitudes, which add together to give a resultant wave whose amplitude, and therefore intensity, varies randomly (or pseudorandomly).

When laser light that has been scattered off a rough surface (e.g., patterned element(s) 202 of FIG. 2) falls on another surface, it forms an "objective speckle pattern." The light at a given point in the speckle pattern is made up of contributions from the whole of the scattering surface. The relative phases of the light waves vary across the surface, so that the sum of the individual waves varies randomly (or pseudorandomly). The "size" of the speckles is a function of the wavelength of the light, the size of the laser beam which illuminates the patterned surface, and the distance between the patterned surface and a target surface for the illumination light.

As described above, in embodiments, an image environment may be illuminated by multiple, complementary speckle patterns, such that images captured of the image environment for each of the speckle patterns may be summed to reduce or eliminate noise. Accordingly, embodiments such as illuminator 102 (FIGS. 1 and 2), optical assembly 400 (FIG. 4), etc., may be configured to illuminate an image environment with multiple speckle patterns. Examples of illuminators 102 configured to illuminate an image environment with multiple speckle patterns are described as follows with respect to FIGS. 6-11.

For instance, FIG. 6 shows a block diagram of an illuminator 600, according to an example embodiment. As shown in FIG. 6, illuminator 600 includes a light source 118, a beam splitter 602, a reflector 604, and first and second patterned elements 606A and 606b (shown in cross-section). Light source 118 is configured to transmit first and second light beams respectively through first and second patterned elements 606A and 606B to generate first and second speckle patterns 618 and 620.

In an embodiment, illuminator 600 operates according to FIG. 7. FIG. 7 shows a step 702 for using a same light source to generate first and second speckle patterns, according to an example embodiment. For example, in a first instance of illuminating the image environment (e.g., at a first time), light source 118 generates coherent light 616, which is received by beam splitter 602. In a first instance of illuminating the image environment with illumination light, beam splitter 602 passes at least portion of coherent light 616 through to first patterned element 606A. As shown in FIG. 6, first patterned element 606A includes a rectangular, transparent body that has opposing first and second surfaces 608 and 610. In another embodiment, first and second surfaces 608 and 610 may be perpendicular to each other, (and first patterned element 606A may be configured to internally reflect light received at first surface 608 ninety (90) degrees out from second surface 610). Such an embodiment may be referred to as "side-feeding", where light from one or more light sources is applied to one or more edges of a patterned element, and reflects internal to the patterned element, out of a common surface of the patterned element towards the image environment.

Coherent light 616 is received at first surface 608 of first patterned element 606A, passes through the transparent body of first patterned element 606A, and exits second surface 610 of first patterned element 606A. First and/or second surface 608 and/or 610 of first patterned element 606A is/are configured to impart a first speckle pattern on coherent light 616, which is transmitted from first patterned element 606A in illumination light as first speckle pattern 618.

In a second instance (e.g., at a second time) of illuminating the image environment with illumination light, beam splitter 602 redirects (e.g., by 90 degrees or other suitable angle) at least a portion of coherent light 616 to second patterned element 606B. Reflector 604 (e.g., a mirror or other element/elements including a reflective surface) is optionally present to aid in directing the redirected coherent light 616 to second patterned element 606B. As shown in FIG. 6, second patterned element 606B includes a rectangular, transparent body that has opposing first and second surfaces 612 and 614. In another embodiment, first and second surfaces 612 and 614 may be perpendicular to each other, (and second patterned element 606B may be configured to internally reflect light received at first surface 612 ninety (90) degrees out second surface 614).

Coherent light 616 is received at first surface 612 of second patterned element 606B, passes through the transparent body of second patterned element 606B, and exits second surface 614 of second patterned element 606B. First and/or second surface 612 and/or 614 of second patterned element 606B is/are configured to impart a second speckle pattern on coherent light 616, which is transmitted from second patterned element 606B in illumination light as second speckle pattern 620.

Accordingly, in an embodiment, at a first time, a controller (e.g., logic subsystem 160 of FIG. 1) is configured to control beam splitter 602 to direct a first instance of coherent light 616 emitted from light source 118 through first patterned element 606A to generate first speckle pattern 618, and at a second time, to control beam splitter 602 to direct a second instance of coherent light 616 emitted from light source 118 through second patterned element 606B to generate second speckle pattern 620. Image sensor 110 may capture a first image of image environment 106 when illuminated by first speckle pattern 618, and a second image of image environment 106 when illuminated by second speckle pattern 620. The first and second images may be analyzed for determining depth information, etc., with respect to the image environment.

First and second speckle patterns 618 and 620 may be configured to be substantially complementary (e.g., opposites, in the case of two speckle patterns). Speckle patterns are substantially complementary when the patterned elements used to generate them are patterned in a complementary manner, so that when the resulting speckle patterns are added together, a substantially uniformly illuminated field is formed—the light intensity throughout the field of illumination is substantially uniform, such that noticeable bright spots/speckles and dark regions are absent. Accordingly, the patterned elements may be patterned with corresponding patterns of depressions/peaks to generate complementary speckle patterns. In an embodiment, complementary speckle patterns may be generated by pattern elements having similar surface roughness (e.g., similar pitch), and substantially orthogonal roughness.

When speckle patterns 618 and 620 are complementary, the first and second images captured from the image environment when illuminated by the first and second speckle patterns 618 and 620 may be summed to form an image of a fully illuminated image environment with reduced or fully eliminated structure noise.

Accordingly, in FIG. 6, a single light source may emit coherent light that is patterned by multiple patterned elements to generate multiple speckle patterns. A single light source may be used to generate coherent light for any number of patterned elements, to generate any number of speckle patterns for illuminating an image environment.

FIG. 8 shows a block diagram of an example illuminator 800, according to another embodiment. As shown in FIG. 8, illuminator 800 includes first and second light sources 118A and 118B and first and second patterned elements 606A and 606*b* (shown in cross-section). Light sources 118A and 118B are configured to transmit first and second light beams through first and second patterned elements 606A and 606B to generate first and second speckle patterns 818 and 822.

In an embodiment, illuminator 800 operates according to FIG. 9. FIG. 9 shows a process for using first and second light sources to generate first and second speckle patterns, according to an example embodiment. For example, in a first instance of illuminating the image environment, light source 118A generates coherent light 816, which is received at first surface 608 of first patterned element 606A, passes through the transparent body of first patterned element 606A, and exits second surface 610 of first patterned element 606A. First and/or second surface 608 and/or 610 of first patterned element 606A is/are configured to impart a first speckle pattern on coherent light 816, which is transmitted from first patterned element 606A in illumination light as first speckle pattern 618.

In a second instance of illuminating the image environment with illumination light, light source 118B generates coherent light 820, which is received at first surface 612 of second patterned element 606B, passes through the transparent body of second patterned element 606B, and exits second surface 614 of second patterned element 606B. First and/or second surface 612 and/or 614 of second patterned element 606B is configured to impart a second speckle pattern on coherent light 820, which is transmitted from second patterned element 606B in illumination light as second speckle pattern 620.

Accordingly, in an embodiment, at a first time, a controller (e.g., logic subsystem 160 of FIG. 1) is configured to control first light source 118A to direct a first instance of coherent light 816 through first patterned element 606A to generate first speckle pattern 818, and at a second time, to control second light source 118B to direct a second instance of coherent light 820 through second patterned element 606B to generate second speckle pattern 822. Image sensor 110 may capture a first image of image environment 106 when illuminated by first speckle pattern 818, and a second image of image environment 106 when illuminated by second speckle pattern 822. The first and second images may be analyzed for determining depth information, etc., with respect to the image environment.

In a similar manner as first and second speckle patterns 618 and 620, first and second speckle patterns 818 and 822 may be configured to be substantially complementary (e.g., opposites, in the case of two speckle patterns). When speckle patterns 818 and 820 are complementary, the first and second images captured from the image environment when illuminated by first and second speckle patterns 818 and 822 may be summed to form an image of a fully illuminated image environment with reduced or fully eliminated structure noise.

Accordingly, in FIG. 8, multiple light sources may emit coherent light that patterned by multiple patterned elements to generate multiple speckle patterns. Any number of light sources may be present that are each paired up with one or more patterned elements to generate any number of speckle patterns for illuminating an image environment.

FIG. 10 shows a block diagram of an example illuminator 1000, according to another embodiment. As shown in FIG. 10, illuminator 1000 includes light source and a patterned element 606 (shown in cross-section). Light source 118 is configured to transmit first and second light beams through patterned element 606 to generate first and second speckle patterns 1004A and 1004B.

In an embodiment, illuminator 1000 operates according to FIG. 11. FIG. 11 shows a step 1102 for using a same light source to transmit light at first and second wavelengths to generate first and second speckle patterns, according to an example embodiment. For example, in a first instance of illuminating the image environment, light source 118 generates coherent light 1002A. Coherent light 1002A is coherent light having a first wavelength. Coherent light 1002A is received at first surface 608 of patterned element 606, passes through the transparent body of patterned element 606, and exits second surface 610 of patterned element 606. First and/or second surface 608 and/or 610 of patterned element 606 is/are configured to impart a first speckle pattern on coherent light 1004A when coherent light 1002A of the first wavelength is received. The first speckle pattern is transmitted from patterned element 606 in illumination light as first speckle pattern 1004A.

In a second instance of illuminating the image environment with illumination light, light source 118 generates coherent light 1002B. Coherent light 1002B is coherent light having a second wavelength that is different from the first wavelength of coherent light 1002A (e.g., different wavelengths of IR light, different wavelengths of visible light, one wavelength of IR light and one wavelength of visible light, etc.). Coherent light 1002B is received at first surface 608 of patterned element 606, passes through the transparent body of patterned element 606, and exits second surface 610 of patterned element 606. First and/or second surface 608 and/or 610 of patterned element 606 is/are configured to impart a second speckle pattern on coherent light 1004B when coherent light 1002B of the second wavelength is received. The second speckle pattern is transmitted from patterned element 606 in illumination light as second speckle pattern 1004B.

Accordingly, in an embodiment, at a first time, a controller (e.g., logic subsystem 160 of FIG. 1) is configured to control light source 118 to direct a first instance of coherent light 1002A through patterned element 606 to generate first speckle pattern 1004A, and at a second time, to control light source 118 to direct a second instance of coherent light 1002B through patterned element 606 to generate second speckle pattern 1004B. Light source 118 may be configured in various ways to generate two or more wavelengths of light, including being a tunable laser, or using high speed modulation to shift the emitted wavelength of light. For instance, light source 118 may chirp or pulse the emitted light at a first rate to create coherent light 1002A at a first wavelength, and may chirp or pulse the emitted light at a second rate to create coherent light 1002B at a second wavelength. The different wavelengths of coherent light 1002A and 1002B interfere differently in the same patterned element 606 to generate the different first and second speckle patterns 1004A and 1004B. Image sensor 110 may capture a first image of image environment 106 when illuminated by first speckle pattern 1004A, and a second image of image environment 106 when illuminated by second speckle pattern 1004B. The first and second images may be analyzed for determining depth information, etc., with respect to the image environment.

In a similar manner as first and second speckle patterns 618 and 620, first and second speckle patterns 1004A and 1004B may be configured to be substantially complementary (e.g., opposites, in the case of two speckle patterns). When speckle patterns 1004A and 1004B are complementary, the first and second images captured from the image environment when illuminated by first and second speckle patterns 1004A and 1004B may be summed to form an image of a fully illuminated image environment with reduced or fully eliminated structure noise.

Accordingly, in FIG. 10, a same (e.g., single) light source may emit coherent light of different wavelengths/frequencies that is patterned by a same patterned element to generate multiple speckle patterns. A same light source may generate any number of different wavelengths that are received by a same patterned element to generate any number of speckle patterns for illuminating an image environment.

In still another embodiment, referred to above as "side-feeding", light from one or more light sources may be applied to one or more edges of a patterned element, to reflect out of a common surface of the patterned element towards the image environment. In such an embodiment, multiple light sources may direct light to a single patterned element, to create multiple speckle patterns in the image environment. The light sources may be time multiplexed (e.g., by logic subsystem 160) so that the patterned element receives light from the light sources sequentially (at one or more sides, such as one light source per side, etc.), to sequentially illuminate the image environment with the speckle patterns.

In still another embodiment, multiple light sources may be directed to a single patterned element using a beam splitter. For instance, in such an embodiment, light sources 118A and 118B may be present, and patterned element 606 may be present. A beam splitter may be configured to receive light from light sources 118A from different path (e.g., from light source 118A straight on, and from light source 118B at a side), and may direct the received light from both light sources 118A and 118B along a common output path (e.g., beam splitter 602 of FIG. 6 oriented in reverse) through patterned element 606. In this manner, in a first instance, coherent light from light source 118A may be transmitted through the beam splitter and patterned element 606 to generate a first speckle pattern in the image environment, and coherent light from light source 118B may be transmitted through the beam splitter and patterned element 606 to generate a second speckle pattern in the image environment.

It is noted that although a projection/relay lens is not shown in FIGS. 6, 8, and 10, such a lens may be present (e.g., projection lens 204 of FIG. 2, projection lens 404 of FIG. 4, etc.). Furthermore, it is noted that the embodiments described above may be combined in any manner. For instance, in one embodiment, if it is desired to generate four different speckle patterns to illuminate an image environment, one light source and two patterned elements may be used (e.g., a combination of illuminators 600 and 1000). The light source (of FIG. 10) may generate first and second coherent light beams at first and second wavelengths to pass through the first patterned element thereby generating first and second speckle patterns, and may generate the first and second coherent light beams at the first and second wavelengths to pass through the second patterned element to thereby generate third and fourth speckle patterns. In another example, first and second light sources that each generate first and second coherent light beams at first and second wavelengths may have their light beams directed by a beam splitter (in reverse of the orientation of beam splitter 602 of FIG. 6) through a single patterned element to enable four speckle patterns to illuminate an image environment. Any further combination of the embodiments of FIGS. 6-11 may be made, to generate any desired number of speckle patterns to illuminate an image environment, as would be apparent to persons skilled in the relevant art(s) from the teachings herein. The generated speckle patterns of any number may be configured to be complementary, as described above, so that a summation of the speckle patterns creates a substantially uniformly illuminated target. In any embodiment, when complementary, all light beams may be simultaneously generated to illuminate the image environment with all of the speckle patterns simultaneously, resulting in uniform illumination of the image environment.

In some embodiments, the methods and processes described above may be tied to a computing system of one or more computing devices. In particular, such methods and processes may be implemented as a computer-application program or service, an application-programming interface (API), a library, and/or other computer-program product.

For example, the embodiment of TOF depth camera 100 shown in FIG. 1 depicts an example of a non-limiting embodiment of a computing system that can perform one or more of the methods and processes described above. For example, in the embodiment shown in FIG. 1, light generation module 150 may include suitable code or instructions to operate illuminator 102 and depth information module 152 may include suitable code or instructions to operate image sensor 110 and interpret image information detected by detector 114. While the module structures shown in FIG. 1 are illustrated as distinct, standalone entities within TOF depth camera 100, it will be appreciated that the functions performed by such module structures may be integrated and/or distributed throughout TOF depth camera 100 and/or a computing device connected with TOF depth camera 100 without departing from the scope of the present disclosure.

The computing system is shown in simplified form. It will be understood that virtually any computer architecture may be used without departing from the scope of this disclosure. In different embodiments, the computing system may take the form of a mainframe computer, server computer, desktop computer, laptop computer, tablet computer, wearable computing device, home-entertainment computer, network computing device, gaming device, mobile computing device, mobile communication device (e.g., smart phone), mobile vehicle (e.g., an automobile, a motorcycle, a boat, etc.), etc.

TOF depth camera 100 includes a logic subsystem 160 and a storage subsystem 162. TOF depth camera 100 may optionally include a display subsystem 164, input/output-device subsystem 166, and/or other components not shown in FIG. 1.

Logic subsystem 160 includes one or more physical devices configured to execute instructions. For example, logic subsystem 160 may be configured to execute instructions that are part of one or more applications, services, programs, routines, libraries, objects, components, data structures, or other logical constructs. Such instructions may be implemented to perform a task, implement a data type, transform the state of one or more components, or otherwise arrive at a desired result. For example, in an embodiment, logic subsystem 160 may control a sequential timing of instances of illumination of an image environment by one or more light sources, may control the timing of corresponding image capture by an image sensor, and may control/execute processing of captured images.

Logic subsystem 160 may include one or more processors configured to execute software instructions. Additionally or alternatively, logic subsystem 160 may include one or more hardware or firmware logic machines configured to execute hardware or firmware instructions. The processors of logic subsystem 160 may be single-core or multi-core, and the programs executed thereon may be configured for sequential, parallel or distributed processing. Logic subsystem 160 may optionally include individual components that are distributed among two or more devices, which can be remotely located and/or configured for coordinated processing. Aspects of the logic subsystem may be virtualized and executed by remotely accessible networked computing devices configured in a cloud-computing configuration.

Storage subsystem 162 includes one or more physical, non-transitory, devices configured to hold data and/or instructions executable by logic subsystem 160 to implement the herein-described methods and processes. When such methods and processes are implemented, the state of storage subsystem 162 may be transformed—e.g., to hold different data.

Storage subsystem 162 may include removable media and/or built-in devices. Storage subsystem 162 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard-disk drive, floppy-disk drive, tape drive, MRAM, etc.), among others physical hardware storage devices. Storage subsystem 162 may include volatile, nonvolatile, dynamic, static, read/write, read-only, random-access, sequential-access, location-addressable, file-addressable, and/or content-addressable physical hardware devices. In some embodiments, logic subsystem 160 and storage subsystem 162 may be integrated into one or more unitary physical devices, such as an application-specific integrated circuit (ASIC), or a system-on-a-chip.

The terms "module" or "program" may be used to describe an aspect of the computing system implemented to perform a particular function. In some cases, a module or program may be instantiated via logic subsystem 160 executing instructions held by storage subsystem 162. It will be understood that different modules and/or programs may be instantiated from the same application, service, code block, object, library, routine, API, function, etc. Likewise, the same module and/or program may be instantiated by different applications, services, code blocks, objects, routines, APIs, functions, etc. The terms "module" and "program" may encompass individual or groups of executable files, data files, libraries, drivers, scripts, database records, etc.

When included, display subsystem 164 may be used to present a visual representation of data held by storage subsystem 162. This visual representation may take the form of a graphical user interface (GUI). As the herein described methods and processes change the data held by the storage subsystem, and thus transform the state of the storage subsystem, the state of display subsystem 164 may likewise be transformed to visually represent changes in the underlying data. Display subsystem 164 may include one or more display devices utilizing virtually any type of technology. Such display devices may be combined with logic subsystem 160 and/or storage subsystem 162 in a shared enclosure, or such display devices may be peripheral display devices.

When included, input/output-device subsystem 166 may be configured to communicatively couple the computing system with one or more other computing devices. Input/output-device subsystem 166 may include wired and/or wireless communication devices compatible with one or more different communication protocols. As non-limiting examples, input/output-device subsystem 166 may be configured for communication via a wireless telephone network, or a wired or wireless local- or wide-area network. In some embodiments, input/output-device subsystem 166 may allow the computing system to send and/or receive messages to and/or from other devices via a network such as the Internet. Input/output-device subsystem 166 may also optionally include or interface with one or more user-input devices such as a keyboard, mouse, game controller, camera, microphone, and/or touch screen, for example.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

IV. Example Embodiments

In one embodiment, a camera comprises: at least one light source; at least one transparent patterned element positioned to receive a plurality of instances of coherent light generated by the at least one light source, the at least one transparent patterned element configured, for each received instance of coherent light, to cause interference of waves of the received instance of coherent light to generate a corresponding instance of illumination light that contains a respective speckle pattern, thereby generating a plurality of instances of illumination light containing a plurality of respective speckle patterns, the plurality of speckle patterns being different from each other; a projection lens positioned to receive each of the instances of illumination light, and to project each of the instances of illumination light into an illumination environment; and an image sensor configured to detect a plurality of instances of return light reflected from the illumination environment corresponding to the plurality of instances of illumination light.

In an embodiment, the camera further comprises an image processor configured to sum the plurality of instances of return light to generate a composite image of the illumination environment.

In an embodiment, the image processor is configured to generate a depth map based at least on the composite image.

In an embodiment, the plurality of speckle patterns are substantially complementary to each other such that a summation of the plurality of speckle patterns forms a substantially uniform illumination pattern.

In an embodiment, the at least one transparent patterned element comprises: a first transparent patterned element positioned to receive a first instance of coherent light generated by the at least one light source, and to cause interference of waves of the first instance of coherent light to generate first instance of illumination light that contains a first speckle pattern; and a second transparent patterned element positioned to receive a second instance of coherent light generated by the at least one light source, and to cause interference of waves of the second instance of coherent light to generate second instance of illumination light that contains a second speckle pattern.

In an embodiment, the at least one light source is a single light source that generates the first instance of coherent light and the second instance of coherent light in sequence.

In an embodiment, the at least one light source comprises: a first light source configured to generate the first instance of coherent light; and a second light source configured to generate the second instance of coherent light.

In an embodiment, the at least one light source comprises: a first light source configured to generate a first instance of coherent light at a first wavelength and to generate a second instance of coherent light at a second wavelength in sequence; and the at least one transparent patterned element comprises: a first transparent patterned element configured to receive the first and second instances of coherent light, to generate a first instance of illumination light containing a first speckle pattern based at least on the first instance of coherent light at the first wavelength, and to generate a second instance of illumination light containing a second speckle pattern based at least on the second instance of coherent light at the second wavelength.

In an embodiment, the at least one light source comprises first and second light sources that each generate first and second instances of coherent light at respective wavelengths; and the at least one transparent patterned element comprises: first and second transparent patterned elements configured to receive the first and second instances of coherent light from each of the first and second light sources, and to generate first, second, third, and fourth instances of illumination light containing respective speckle patterns based at least on the first and second instances of coherent light received from each of the first and second light sources.

In another embodiment, an optical assembly comprises: at least one transparent patterned element positioned to receive a plurality of instances of coherent light generated by at least one light source, the at least one transparent patterned element configured, for each received instance of coherent light, to cause interference of waves of the received instance of coherent light to generate a corresponding instance of illumination light that contains a respective speckle pattern, thereby generating a plurality of instances of illumination light containing a plurality of respective speckle patterns, the plurality of speckle patterns being substantially complementary to each other; a projection lens positioned to receive each of the instances of illumination light, and to project each of the instances of illumination light into an illumination environment.

In an embodiment, the plurality of speckle patterns are substantially complementary to each other such that a summation of the plurality of speckle patterns forms a substantially uniform illumination pattern.

In an embodiment, the at least one transparent patterned element comprises: a first transparent patterned element positioned to receive a first instance of coherent light generated by the at least one light source, and to cause interference of waves of the first instance of coherent light to generate first instance of illumination light that contains a first speckle pattern; and a second transparent patterned element positioned to receive a second instance of coherent light generated by the at least one light source, and to cause interference of waves of the second instance of coherent light to generate second instance of illumination light that contains a second speckle pattern.

In an embodiment, the at least one light source is a single light source that generates the first instance of coherent light and the second instance of coherent light in sequence.

In an embodiment, the at least one light source comprises: a first light source configured to generate the first instance of coherent light; and a second light source configured to generate the second instance of coherent light.

In an embodiment, the at least one light source comprises: a first light source configured to generate a first instance of coherent light at a first wavelength and to generate a second instance of coherent light at a second wavelength in sequence; and the at least one transparent patterned element comprises: a first transparent patterned element configured to receive the first and second instances of coherent light, to generate a first instance of illumination light containing a first speckle pattern based at least on the first instance of coherent light at the first wavelength, and to generate a second instance of illumination light containing a second speckle pattern based at least on the second instance of coherent light at the second wavelength.

In an embodiment, the at least one light source comprises first and second light sources that each generate first and second instances of coherent light at respective wavelengths; and the at least one transparent patterned element comprises: first and second transparent patterned elements configured to receive the first and second instances of coherent light from each of the first and second light sources, and to generate first, second, third, and fourth instances of illumination light containing respective speckle patterns based at least on the first and second instances of coherent light received from each of the first and second light sources.

In another embodiment, a method of projecting illumination light into an image environment is provided. The method comprises: generating a plurality of instances of coherent light in sequence; from each instance of coherent light of the plurality of instances of coherent light, generating a corresponding instance of illumination light that contains a respective speckle pattern, thereby generating a plurality of instances of illumination light containing a plurality of respective speckle patterns, the plurality of speckle patterns being configured such that a summation of the plurality of speckle patterns forms a substantially uniform illumination pattern; and projecting the plurality of instances of illumination light into an illumination environment in sequence.

In an embodiment, the method further comprises: detecting a plurality of instances of return light reflected from the illumination environment corresponding to the plurality of instances of illumination light.

In an embodiment, the method further comprises: summing the plurality of instances of return light to generate a composite image of the illumination environment.

In an embodiment, the method further comprises: generating a depth map based at least on the composite image.

V. Conclusion

While various embodiments of the present disclosure have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A camera, comprising:
   at least one light source;
   at least one transparent patterned element positioned to receive a plurality of instances of coherent light generated by the at least one light source, the at least one transparent patterned element configured, for each received instance of coherent light, to cause interference of waves of the received instance of coherent light to generate a corresponding instance of illumination light that contains a respective speckle pattern, thereby generating a plurality of instances of illumination light containing a plurality of respective speckle patterns, a first speckle pattern of the plurality of speckle patterns configured to fill in areas of an illumination environment not filled by a second speckle pattern of the plurality of speckle patterns;
   a projection lens positioned to receive each of the instances of illumination light, and to project each of the instances of illumination light into an illumination environment; and
   an image sensor configured to detect a plurality of instances of return light reflected from the illumination environment corresponding to the plurality of instances of illumination light.

2. The camera of claim 1, further comprising:
   an image processor configured to sum the plurality of instances of return light to generate a composite image of the illumination environment.

3. The camera of claim 2, wherein the image processor is configured to generate a depth map based at least on the composite image.

4. The camera of claim 1, wherein the plurality of speckle patterns are substantially complementary to each other such that a summation of the plurality of speckle patterns forms a substantially uniform illumination pattern.

5. The camera of claim 1, wherein the at least one transparent patterned element comprises:
   a first transparent patterned element positioned to receive a first instance of coherent light generated by the at least one light source, and to cause interference of waves of the first instance of coherent light to generate first instance of illumination light that contains the first speckle pattern; and
   a second transparent patterned element positioned to receive a second instance of coherent light generated by the at least one light source, and to cause interference of waves of the second instance of coherent light to generate second instance of illumination light that contains the second speckle pattern.

6. The camera of claim 5, wherein the at least one light source is a single light source that generates the first instance of coherent light and the second instance of coherent light in sequence.

7. The camera of claim 5, wherein the at least one light source comprises:
   a first light source configured to generate the first instance of coherent light; and
   a second light source configured to generate the second instance of coherent light.

8. The camera of claim 1, wherein the at least one light source comprises:
   a first light source configured to generate a first instance of coherent light at a first wavelength and to generate a second instance of coherent light at a second wavelength in sequence; and
   the at least one transparent patterned element comprises:
   a first transparent patterned element configured to receive the first and second instances of coherent light, to generate a first instance of illumination light containing the first speckle pattern based at least on the first instance of coherent light at the first wavelength, and to generate a second instance of illumination light containing the second speckle pattern based at least on the second instance of coherent light at the second wavelength.

9. The camera of claim 1, wherein the at least one light source comprises first and second light sources that each generate first and second instances of coherent light at respective wavelengths; and the at least one transparent patterned element comprises:
first and second transparent patterned elements configured to receive the first and second instances of coherent light from each of the first and second light sources, and to generate first, second, third, and fourth instances of illumination light containing respective speckle patterns including the first and second speckle patterns based at least on the first and second instances of coherent light received from each of the first and second light sources.

10. An optical assembly, comprising:
at least one transparent patterned element positioned to receive a plurality of instances of coherent light generated by at least one light source, the at least one transparent patterned element configured, for each received instance of coherent light, to cause interference of waves of the received instance of coherent light to generate a corresponding instance of illumination light that contains a respective speckle pattern, thereby generating a plurality of instances of illumination light containing a plurality of respective speckle patterns, a first speckle pattern of the plurality of speckle patterns configured to fill in areas of an illumination environment not filled by a second speckle pattern of the plurality of speckle patterns; and a projection lens positioned to receive each of the instances of illumination light, and to project each of the instances of illumination light into an illumination environment.

11. The optical assembly of claim 10, wherein the plurality of speckle patterns are substantially complementary to each other such that a summation of the plurality of speckle patterns forms a substantially uniform illumination pattern.

12. The optical assembly of claim 10, wherein the at least one transparent patterned element comprises:
a first transparent patterned element positioned to receive a first instance of coherent light generated by the at least one light source, and to cause interference of waves of the first instance of coherent light to generate first instance of illumination light that contains the first speckle pattern; and
a second transparent patterned element positioned to receive a second instance of coherent light generated by the at least one light source, and to cause interference of waves of the second instance of coherent light to generate second instance of illumination light that contains the second speckle pattern.

13. The optical assembly of claim 12, wherein the at least one light source is a single light source that generates the first instance of coherent light and the second instance of coherent light in sequence.

14. The optical assembly of claim 12, wherein the at least one light source comprises:
a first light source configured to generate the first instance of coherent light; and
a second light source configured to generate the second instance of coherent light.

15. The optical assembly of claim 10, wherein the at least one light source comprises:
a first light source configured to generate a first instance of coherent light at a first wavelength and to generate a second instance of coherent light at a second wavelength in sequence; and the at least one transparent patterned element comprises:
a first transparent patterned element configured to receive the first and second instances of coherent light, to generate a first instance of illumination light containing the first speckle pattern based at least on the first instance of coherent light at the first wavelength, and to generate a second instance of illumination light containing the second speckle pattern based at least on the second instance of coherent light at the second wavelength.

16. The optical assembly of claim 10, wherein the at least one light source comprises first and second light sources that each generate first and second instances of coherent light at respective wavelengths; and the at least one transparent patterned element comprises:
first and second transparent patterned elements configured to receive the first and second instances of coherent light from each of the first and second light sources, and to generate first, second, third, and fourth instances of illumination light containing respective speckle patterns including the first and second speckle patterns based at least on the first and second instances of coherent light received from each of the first and second light sources.

17. A method of projecting illumination light into an image environment, the method comprising:
generating a plurality of instances of coherent light in sequence;
from each instance of coherent light of the plurality of instances of coherent light, generating a corresponding instance of illumination light that contains a respective speckle pattern, thereby generating a plurality of instances of illumination light containing a plurality of respective speckle patterns, a first speckle pattern of the plurality of speckle patterns configured to fill areas of an illumination environment not filled by a second speckle pattern of the plurality of speckle patterns, the plurality of speckle patterns being configured such that a summation of the plurality of speckle patterns forms a substantially uniform illumination pattern; and
projecting the plurality of instances of illumination light into an illumination environment in sequence.

18. The method of claim 17, further comprising:
detecting a plurality of instances of return light reflected from the illumination environment corresponding to the plurality of instances of illumination light.

19. The method of claim 17, further comprising:
summing the plurality of instances of return light to generate a composite image of the illumination environment.

20. The method of claim 19, further comprising:
generating a depth map based at least on the composite image.

* * * * *